United States Patent
Lauer et al.

(10) Patent No.: US 6,310,620 B1
(45) Date of Patent: Oct. 30, 2001

(54) METHOD AND APPARATUS FOR VOLUME RENDERING WITH MULTIPLE DEPTH BUFFERS

(75) Inventors: Hugh C. Lauer, Concord; Larry D. Seiler, Boylston, both of MA (US)

(73) Assignee: Terarecon, Inc., San Mateo, CA (US)

( * ) Notice: Subject to any disclaimer, the term of this patent is extended or adjusted under 35 U.S.C. 154(b) by 0 days.

(21) Appl. No.: 09/219,059

(22) Filed: Dec. 22, 1998

(51) Int. Cl.[7] .................................................. G06T 17/00
(52) U.S. Cl. ............................................. 345/424; 345/434
(58) Field of Search ..................................... 345/419, 420, 345/421, 422, 423, 424, 425, 434

(56) References Cited

U.S. PATENT DOCUMENTS

| | | | |
|---|---|---|---|
| 3,816,726 | * 6/1974 | Sutherland et al. | 235/152 |
| 4,882,679 | * 11/1989 | Tuy et al. | 364/413.22 |
| 5,088,054 | * 2/1992 | Paris, II | 395/121 |
| 5,226,113 | * 7/1993 | Cline et al. | 395/124 |
| 5,515,484 | * 5/1996 | Sfarti et al. | 395/124 |
| 5,579,455 | * 11/1996 | Greene et al. | 395/122 |
| 5,819,017 | * 10/1998 | Akeley et al. | 395/122 |
| 5,880,735 | * 3/1999 | Shinohara | 345/419 |
| 5,949,423 | * 9/1999 | Olsen | 345/422 |
| 5,963,211 | * 10/1999 | Oikawa et al. | 345/424 |

\* cited by examiner

*Primary Examiner*—Mark Zimmerman
*Assistant Examiner*—Enrique L Santiago
(74) *Attorney, Agent, or Firm*—Dirk Brinkman

(57) ABSTRACT

A method for rendering a three-dimensional volume onto a two-dimensional image plane partitions translucent portions of the volume as defined by polygons into layers. The layers are sorted in a front-to-back order. A near color buffer is set to a transparent color, and a near depth buffer is set to a near clip surface. Then, the layers are processed in the sorted order by initializing a far color buffer to a background color, initializing a far depth buffer to a far clip surface, drawing a current layer into the far color and depth buffers, and rendering the volume, from the near clip surface to the far clip surface, into the near color and depth buffers. After all of the layers have been processed the far color buffer is reinitialized to the background color, the far depth buffer is reinitialized to the far clip surface, and the volume, from the near clip surface to the far clip surface, is rendered into the near color and depth buffers.

17 Claims, 6 Drawing Sheets

METHOD AND APPARATUS FOR VOLUME RENDERING WITH MULTIPLE DEPTH BUFFERS

FIELD OF THE INVENTION

This invention relates generally to computer graphics, and more particularly, to rendering the interior structures of objects or models.

BACKGROUND OF THE INVENTION

The field of rendering three-dimensional (3D) objects or synthetic models can be partitioned into two main areas: polygon rendering and volume rendering. Polygon rendering is only concerned with the surface topology, whereas volume rendering also deals with the internal structure of objects or models.

Polygon Rendering

In processors and processes designed for polygon rendering, the surfaces of the object or model are described in terms of polygons, e.g., triangles and lines. These fundamental geometric components are used to generate constituent "fragments" representing the outer surface. A fragment is defined as all information (data) required to render ("draw") a single image pixel that is on the surface, for example, the x and y coordinates of the pixel, the red, green, and blue color values of the pixel, an alpha value representing opacity, depth values, texture coordinates, and the like. Fragments can be blended into a color (or image) buffer before being rendered as pixels.

Volume Rendering

In processors and processes designed for volume rendering, the basic building block is a 3D voxel. Depending on a viewing or projecting orientation (view frustum), voxels can be interpolated to yield volume samples. The interpolated volume samples can be considered to be equivalent to fragments as defined above. Volume rendering produces a base plane, or 2D array of color values, which can be considered equivalent to the image plane. This correspondence makes it easier to integrate polygon rendering with volume rendering and application programming interfaces of commonly used rendering systems.

One natural problem in 3D rendering, polygon or volume, is dealing with how best to represent the third dimension for purposes of comparing positions of objects, determining occlusion, clip, cropping, etc.

Depth in Polygon Rendering

For example, OpenGL, a commonly used graphic rendering tool, stores a single depth (z) value for each pixel located at a planar (x, y) position in the image buffer. There, each fragment is either blended into the image buffer or discarded, depending on a selectable comparison with the corresponding depth of the fragment, and the depth value associated with the corresponding pixel. Normally, the depth comparison operator is less-than, and a depth buffer is initialized with a predetermined background color and depth values. If the depth of the fragment is less than the corresponding depth, then the sample is blended, otherwise the sample is discarded.

In order to accommodate more complex applications, OpenGL allows the selection of any one of eight relational comparisons. For opaque fragments, the comparison operation causes the result to be the same as if the fragments were sorted before being rendered. For example, a less-than comparison selects fragments with smaller depth values and discards those with larger depth values. This is equivalent to sorting the fragments from back (larger depth) to front (smaller depth) with respect to the point of view.

With OpenGL, there is no good way to render translucent, depth-buffered triangles. Opaque triangles can be rendered in any order, and the blending under the control of the depth information provides a well-known method of removing hidden lines and surfaces from the scene. However for translucent triangles, the resulting value of a pixel in the image buffer depends on the order in which the triangles are presented. Therefore, in OpenGL, a common technique for rendering non-opaque geometries (polygons) is to first render opaque triangles, then to sort translucent triangles, and to last render the triangles in a back-to-front order. If two translucent triangles intersect in such a way that each partially occludes the other, then the triangles must first be partitioned into smaller non-occluding triangles before rendering.

In effect, the OpenGL depth buffer defines a dynamic clip surface. The depth buffer separates fragments that are nearer the image plane from those that are farther, making it possible to selectively discard fragments on this basis. Moreover, the depth buffer is dynamically updated during rendering, thereby "moving" the clip surface so that later fragments are handled differently from earlier fragments.

Another known method for rendering translucent polygons does not require the sorting and subdividing of the triangles. Instead, that method uses multiple rendering passes with two depth buffers. The two depth buffers are used to sort the translucent fragments. However, that method cannot be used with OpenGL, because OpenGL only supports a single depth buffer. Other methods sort triangles from front-to-back instead of back-to-front. A front-to-back order is more efficient because this order allows the equivalent of early ray termination, which involves ignoring objects that are occluded by nearer objects. All of these methods basically try to render a set of (initially) unordered triangles as if all of their fragments were rendered back-to-front or front-to-back at each pixel location.

Depth in Volume Rendering

While rendering a volume, it may be better to render front-to-back, rather than back-to-front. Front-to-back allows one to perform early ray termination. However, the difference between the two orders is simply a matter of efficiency: front-to-back order with Under blending should produce the same result as back-to-front order with Over blending. In many cases, the rendering order can be selected on a basis of personal preference. To be consistent with OpenGL, a depth buffer used during volume rendering should affect volume samples the same way that the OpenGL depth buffer affects fragments. The depth of each volume sample should be compared against the corresponding value in the depth buffer, and the color of the sample must then be either blended or discarded, depending on the result of the comparison. The initial values of the color buffer defines a background color or an image of some other object. The initial values must be blended behind the samples that are not discarded.

Complex Volume Rendering

There are many applications where some objects are represented as volumes and other objects are modelled as polygons. It is desired to depict all objects in the same final image. Moreover, these objects may interpenetrate each other. For example, markers, tools, and other objects modelled as polygons may need to be embedded into an object represented as a volume and must be rendered in correct juxtaposition with respect to the volume for any view direction. In an example medical application, a volume object representing a human heart, and another volume object representing the human lungs and bronchia must be rendered onto the same image so that the heart is in correct juxtaposition with respect to the lungs.

Consider the case where an opaque geometry is to be blended during volume rendering. In back-to-front terms, this can be done by first rendering the opaque geometry, then copying the resulting depth image to a depth buffer and base plane. Next, set the depth comparison to less-than, and render the volume from back-to-front. This sequence of operations discards volume samples that are behind the opaque geometry, in other words, volume samples that have depth values greater than or equal to the depth buffer. The Over operation is used to blend samples that are in front, i.e., samples that have depth values that are less than the depth buffer.

The same effect can be achieved with front-to-back volume rendering. Let $Z_G$ be a depth buffer, and let $C_G$ be a color buffer separate from the base plane. Proceed as follows: Render the opaque geometry using, for example, OpenGL, and copy the resulting image and depth values to $C_G$ and $Z_G$, respectively. Next, initialize the base plane to RGBα=0. Follow this step by rendering the volume. For each sample, compare the z-coordinate of the sample's position to the corresponding value in $Z_G$ and discard the sample unless the sample passes the less-than test, unless the sample lies strictly in front of the depth buffer $Z_G$. Blend the non-discarded samples into the base plane using the Under operation. As a final step, blend the contents of $C_G$ under the base plane, also using the Under operation. This produces the same effect as rendering back-to-front with Over and with the base plane initialized to the opaque geometry color.

These techniques are not restricted to opaque geometry, they can also support a single layer of translucent geometry as follows. Render the geometry in OpenGL. Copy the resulting RGBα and z-values to $C_G$ and $Z_G$, respectively. Clear the base plane to RGBα=0. Render the volume as with opaque geometry, discarding all sample values that fail the less-than test against $Z_G$. Continue until all rays terminate, either by failing the depth test, or by becoming opaque, or by reaching the end of the volume, whichever comes first.

Next, blend the contents of $C_G$ using the Under operation and store the result back into the base plane. Then in a second pass, do not clear the base plane. Render the volume with depth test greater-or-equal, i.e., discard samples that are in front of the depth buffer and accept those greater than or equal to it while blending with the Under operation. The result is a "sheet" of translucent geometry through the volume. Finally, blend the background color behind the resulting base plane. This can also be done in a single pass. Simply add another z-value test that means "blend geometry now," along with an additional set of blending stages to carry out the blending operation between two samples without losing any cycles.

However, these techniques have serious limitations. A single depth buffer does not support embedded multi-layer translucent (non-opaque) geometries. Some applications are likely to have opaque geometries, e.g., markers or prosthetics in medical applications. Other applications, such as geological surveys, can include embedded fault planes or other translucent geometry and markers. These translucent objects are likely to overlap, producing multiple layers of geometry to blend into the volume. Moreover, there are many possible mixes of opaque and translucent geometries that need to be handled while combining volume objects and polygon objects in the same scene.

Therefore, it is desired to provide a method and system for rendering volumetric objects and models including complex opaque and translucent internal structures.

SUMMARY OF THE INVENTION

Provided is a method and apparatus for rendering a three-dimensional volume onto a two-dimensional image plane in such a way that other objects can be embedded into the volume. In the method according to the invention, two depth buffers are employed to define a near clip surface and a far clip surface. Multiple color buffers are also be employed, one corresponding to each clip surface.

The portion of the volume lying between the two clip surfaces is then rendered, with the color and opacity from each ray being initialized from the near color buffer, and the accumulated color and opacity being blended with the far color buffer.

The two clip surfaces and color buffers are then combined and a new clip surface and a new color buffer are generated from the combined result. The portion of the volume lying between the combined clip surface and the next clip surface is rendered in a manner like the previous portion. These steps are repeated until the entire volume is rendered, with color and opacity being accumulated a portion at a time, and combined with the color and opacities of the various color buffers introduced between the portions.

Each color and depth buffer represents part or all of a surface of an object embedded into the volume. By rendering the volume between the surfaces and blending the color and opacity of each surface, a scene comprising a volume with embedded objects is achieved. Moreover, the surfaces of the embedded objects may be translucent, thereby allowing portions of the volume and other occluded objects to show through those surfaces. By these means, complex opaque and translucent structures can be displayed.

DETAILED DESCRIPTION OF PREFERRED EMBODIMENTS

System Structure

Figure 1:
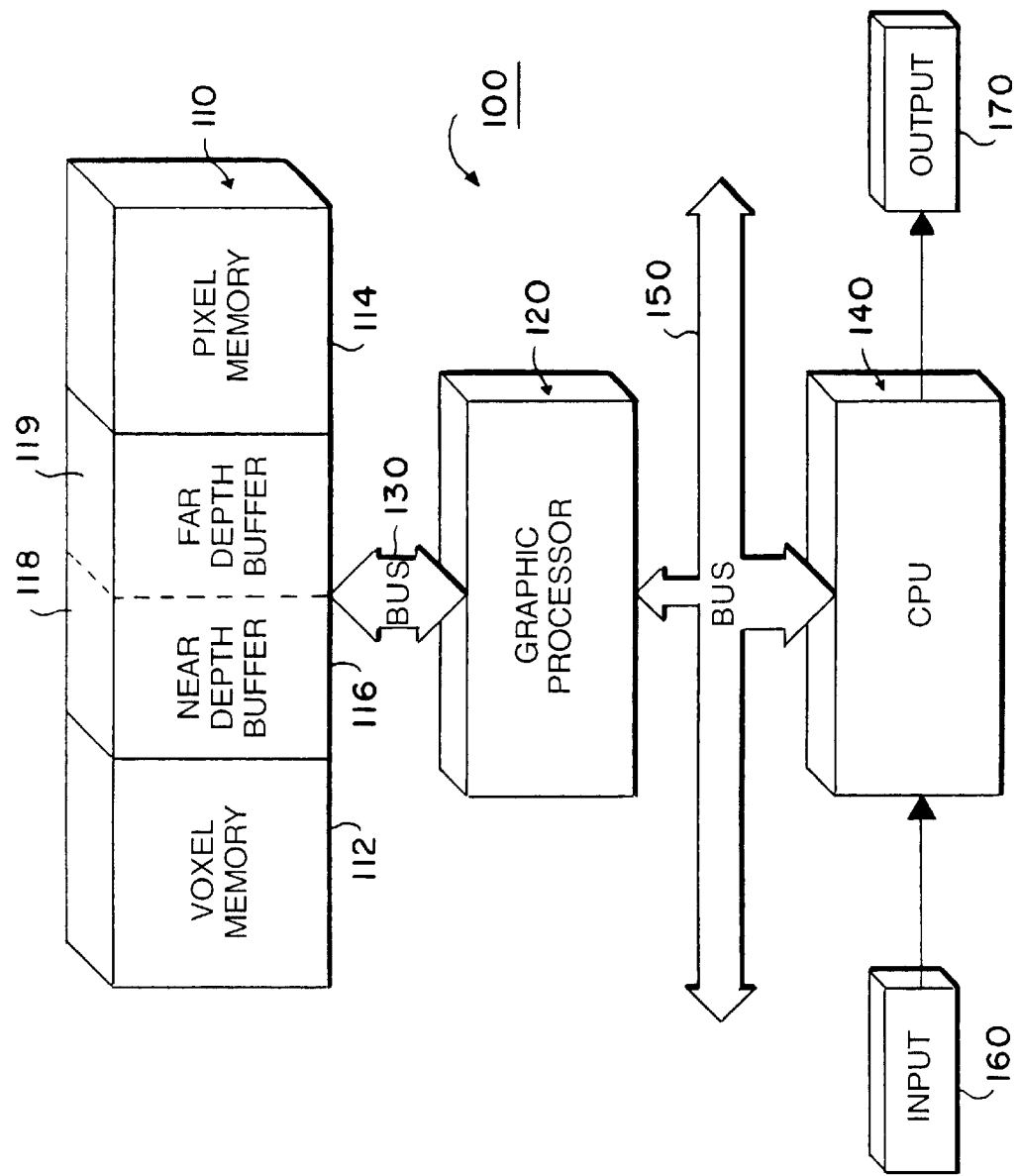
FIG. 1 is a block diagram of a rendering system using the present invention.

In FIG. 1, we show a general environment that can use our invention. A system 100 renders three-dimensional (3D) objects or models onto a two-dimensional (2D) image plane. The system 100 includes a graphic processor 120 connected to a graphic memory 110 by a memory bus 130. The graphic processor 120 is connected to a computer system (CPU) 140 by a general purpose bus 150. The CPU 140 is connected to input and output devices 160 and 170. Input devices can be sources of graphic data and commands to manipulate the data. Output devices can include a display device.

The graphic memory 110 can be allocated to store various types of graphic data. For example, the memory 110 can include a voxel memory 112 and pixel memory (C) 114 to respectively store voxel data and pixel (color) data. Pixel memory is also known as image buffers or color buffers. It should be noted, that portions of the memory 110 can be allocated for other purposes depending on the particular rendering methodology used. For example, a section memory can be used when a volume is rendered a section at the time.

The CPU 140 is conventional. Graphic data and control commands are presented via the input devices 160, and rendered images are presented to the output devices 170. The input data can represent real objects or models. The input data can be acquired by microscopes, cameras, telescopes, scanners, transducers, and the like, or the input data can be generated synthetically to model, for example, physical systems.

The transformation of input data (voxels) to output data (pixels) is performed by the graphic processor 120 described in greater detail below. It should be understood that the functionality of the processor can also be achieved by software processes, although usually at a significantly slower speed.

Multiple Depth Buffers

In accordance with our invention, a portion of the memory 110 is allocated to multiple depth buffers 116, for example a near (or beginning) depth buffer ($Z_n$) 118 and a far (or ending) depth buffer ($Z_f$) 119. The use and advantages of multiple depth buffers 116 will be describe in greater detail below. We use at least two depth buffers to render a three-dimensional graphic object. In effect, the depth buffers define "clip" surfaces that are used to select portions of the object to render. For front-to-back rendering, the near depth buffer defines a beginning clip surface, and the far depth buffer defines an ending clip surface. It should be understood that additional clip surfaces can be defined by adding more depth buffers.

System Operation

Figure 2:
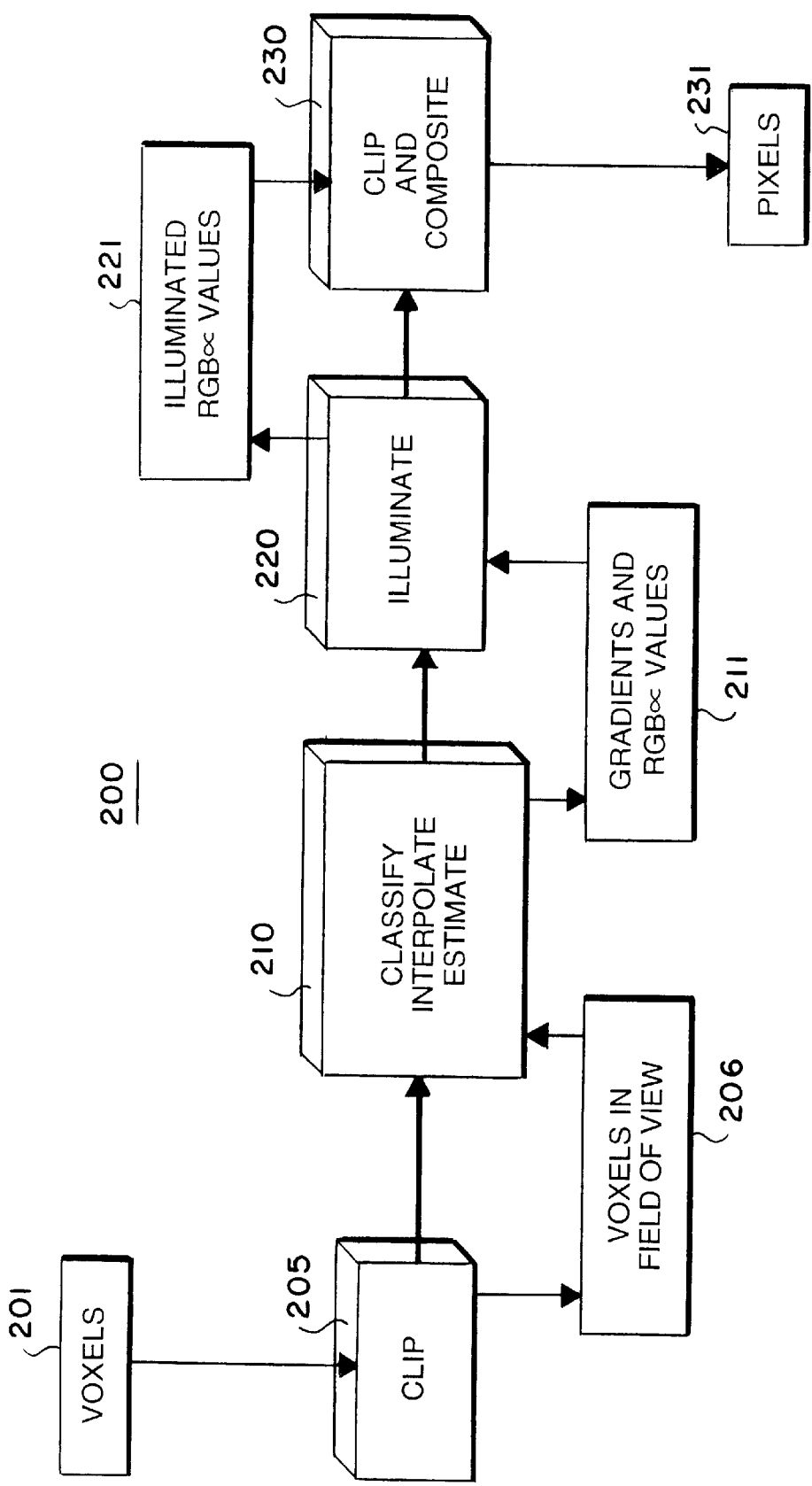
FIG. 2 is a flow diagram of a process used by the system of FIG. 1.

We described the general operation of the graphic processor or processes 120 with reference to FIG. 2. As stated above, the functionality of the graphic processor 120 can also be attained by a software process, although in order to achieve high performance, we prefer a hardware implementation. In fact, as a feature, we implement the graphic processor 120 on a single semiconductor chip using parallel data processing pipelines.

As shown in FIG. 2, a pipelined processor or process 200 proceeds as follows. Voxels 201 are first clipped 205 to remove parts of the volume that lie outside of the field of view or view frustum. The remaining sample values 206 are classified and interpolated, and gradients are estimated 210. The order in which the classification, interpolation, and gradient estimation sub-steps are performed may vary for different applications.

In any case, step 210 assigns the color (RGB) and opacity (α) values 211 to the sample values, along with an estimation of the gradient at each sample point. These resulting RGBα values 211 are then illuminated 220 to introduce highlights and shadows, thereby providing a more realistic image of a 3D object. The illumination step 220 may make use of a reflectance map.

Last, the illuminated samples 221 are composited in step 230. This step may also include an optional additional clip step. Compositing refers to the steps of accumulating and blending of color and opacity values at sample points along rays and of assigning this information to pixels 231 of the 2D image.

Introduction to Multiple Depth Buffers

Figure 3:
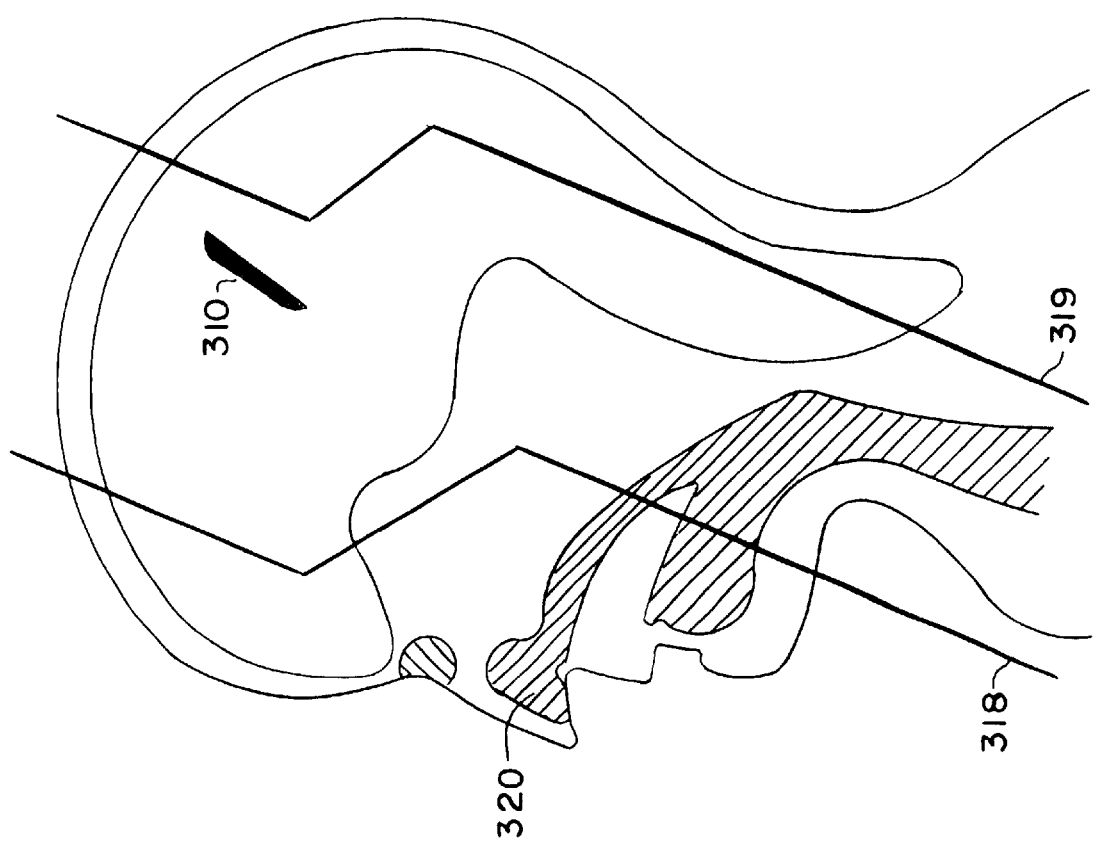
FIG. 3 diagrams a volume or model between two depth surfaces.

As shown in FIG. 3, each depth buffer 118 and 119 of FIG. 1 defines a corresponding "clip" surface or shape. The near depth buffer 118 defines a near or beginning clip surface 318, and the far depth buffer 119 defines a far or ending clip surface 319. The object includes opaque portions 310 shown as solids, and translucent portions 320 shown shaded. The near and far clip surfaces define how the volume 300 is to be rendered.

As an advantage, our invention enables the rendering of portions of the object having drastically different characteristics and arbitratry geometric configurations, for example, interpenetrating objects. Portions of the volume can be clipped out so they are excluded from the rendering. In addition, our invention allows us to integrate polygon and volume rendering techniques.

The General Method

Figure 4:
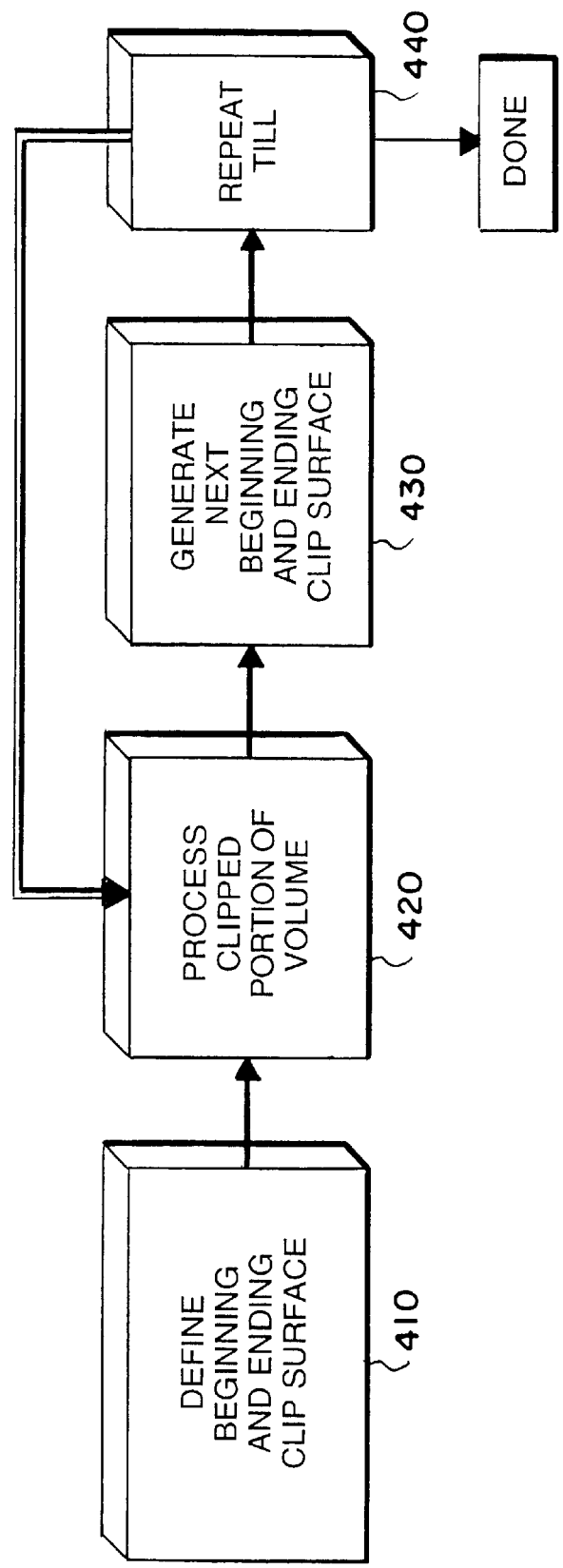
FIG. 4 flow diagram of a process that renders a portion of a volume between clipping surfaces.

FIG. 4 shows the steps of the general volume rendering method according to our invention. Step 410 defines a beginning clip surface and an ending clip surface. A portion of the volume having a predetermined relationship to the beginning clip surface and the ending clip surface is processed in step 420. Step 430 generates a next beginning clip surface by combining the beginning and ending clip surfaces. Step 430 also generates a next ending clip surface. Step 440 repeats the processing and generating for the next beginning and ending clip surfaces until a termination condition is reached.

Double Comparison

Figure 5:
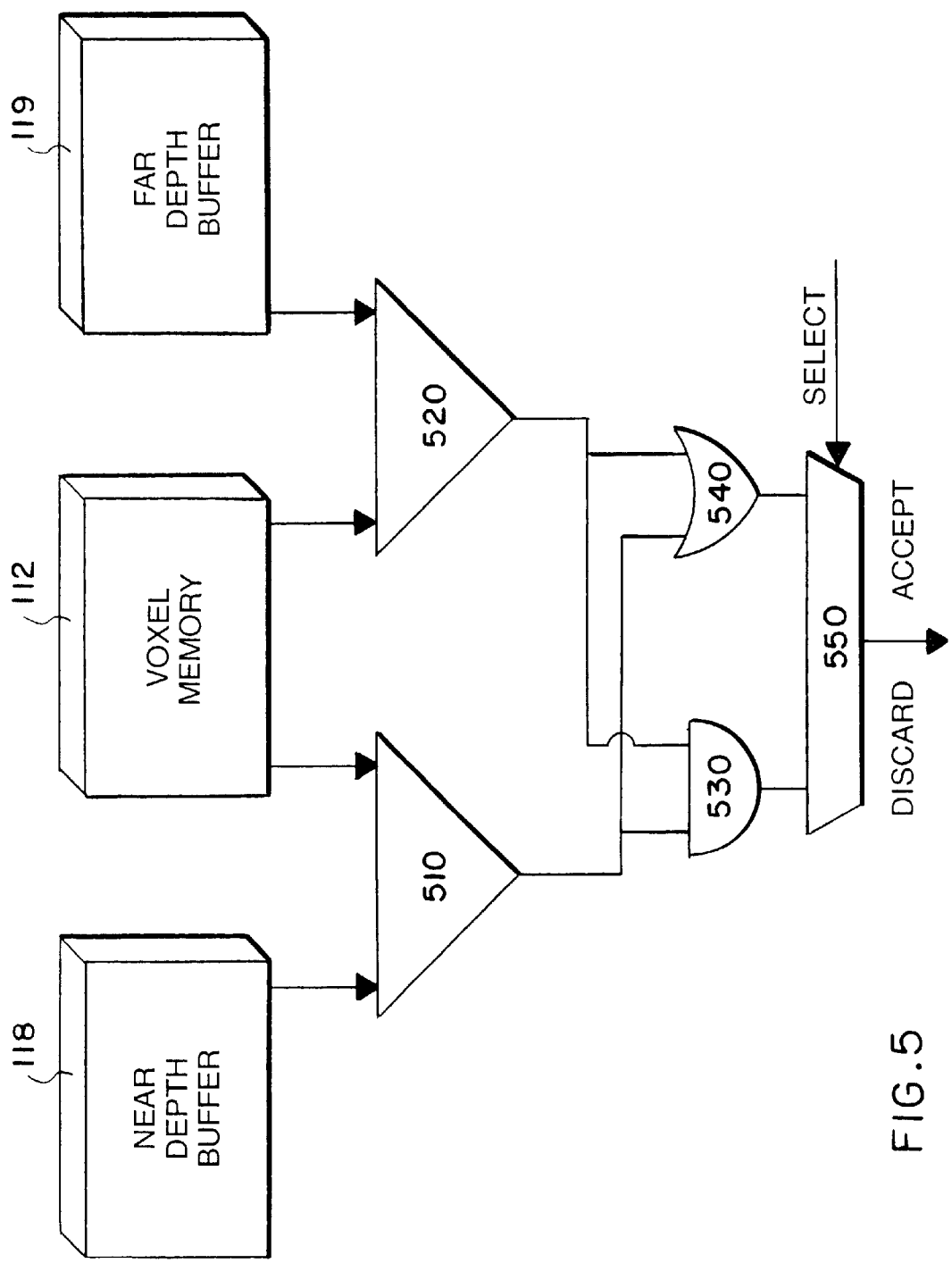
FIG. 5 is a schematic of a double comparator circuit to select or discard volume samples during composition.

FIG. 5 shows the means for determining the relationship between the portion of the volume and the two clip surfaces during the processing of the portion. The means include two relational comparators 510 and 520. The comparators are for comparing the depth of each volume sample stored in the voxel memory 112 against the depth values in depth buffers 118 and 119. If both tests pass (AND 530), render the sample; otherwise, discard it. We can also provide a mode (OR 540) to render the sample if either test passes. The mode (AND/OR) can be selected by multiplexer 550. The predetermined relational operators can be less than, equal to, greater than, or combinations thereof, or render always or render never.

Figure 6:
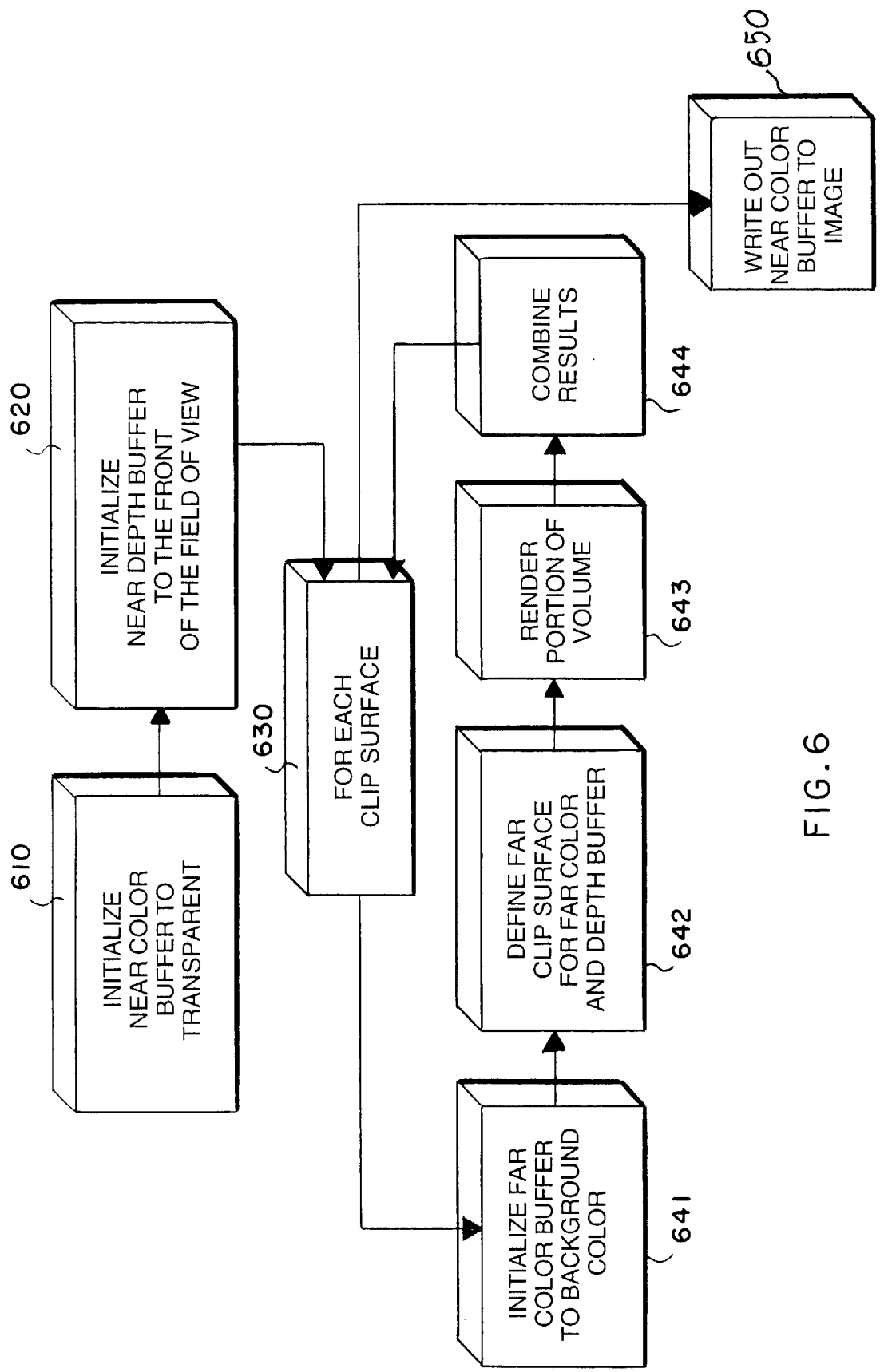
FIG. 6 is a flow diagram of a process according to the invention.

Having multiple depth buffers opens up a number of opportunities to render scenes with combinations of polygon geometry and volume objects that are far more complex than can be achieved with, say, traditional texture-based volume rendering. Moreover, we make it possible to render in real-time. We now describe the method in greater detail for a particular sample application as shown in FIG. 6. Variations for other applications are given below.

Processing Depth Information in Multiple Depth Buffers

Step 610 initializes a near color buffer ($C_n$) to a transparent color, e.g., transparent black (RGBα=0). Step 620 initializes the near (beginning) depth buffer ($Z_n$) to the near clip surface, i.e., what will be the front plane of the view frustum.

Clip surfaces can be defined in a number of ways. For example, with Open GL, the application may sort the polygons into layers in order to define a clip surface. With other methods, the clip surfaces are defined in the volume. Opacity or gradient thresholds can be used to find surfaces of embedded objects.

Then, for each clip surface (630), perform steps 641–644. The far color buffer ($C_f$) is initialized to the clip surface. Initialize the far depth buffer ($Z_f$) to the depth of the far clip surface. Render the portion of the volume by selecting only those samples with depth values greater than or equal to the near clip surface and less than the far clip surface. Combine the result (accumulated RGBα values) in the near color and depth buffers, and repeat for the next clip surface.

When a termination condition is reached, for example, the entire volume has been rendered, step 650 writes out the near color buffer to the image. It should be noted that each clip surface need not cover the entire image plane. For each pixel not covered by a clip surface, the corresponding depth values of the far clip surface should be set to values less than that of the near clip surface. By this technique, parts of the volume not covered by a particular clip surface are not selected during rendering.

A number of applications of our general method are now described. For example, our invention with two depth buffers makes it possible to clip a volume against an arbitrary 3D surface. We also make it possible to embed arbitrarily complex translucent geometry into a volume using a multi-pass algorithm. By including the capability to write to multiple depth buffers, e.g., upon the exit from a surface of the volume, it also becomes possible to render multiple interpenetrating volume objects in the same scene. This is useful, for example, when rendering the heart and the lungs as separate objects, but so that they appear in proper juxtaposition with respect to each other.

Clipping to Arbitrary Surfaces

Let $Z_n$ and $Z_f$ be the two depth buffers 118 and 119, respectively. We can arbitrarily clip to some 3D surface as follows. Render the front facing polygons to $Z_n$, and the back facing polygons to $Z_f$. Then, select the depth mode to render samples that pass both (logical AND) a greater-than test on $Z_n$ and a less-than test on $Z_f$. This can be done with the circuit of FIG. 5. As a result, sample points are rendered only if they are between $Z_n$ and $Z_f$. Note that each ray can terminate as soon as its z-coordinate reaches $Z_f$.

We can also clip an arbitrary 3D surface out of the interior of the volume 300. Render the front facing polygons to $Z_n$, and the back facing polygons to $Z_f$, as before. Then, select the depth mode to render samples that pass either a less-than test on $Z_n$ or a greater-than test on $Z_f$ (logical OR). As a result, sample points are only rendered when they are outside $Z_f$ and $Z_n$.

Note, the depth comparison tests can be done at the beginning of the pipeline 200, and at the compositing stage 230. This allow us to skip voxels whose dependent samples will be clipped out by the depth test later in the pipeline 200. Skipping voxels decreases memory accesses.

Embedding Multi-Layered Translucent Geometry

In order to embed arbitrary translucent geometry into a volume, it is first necessary to divide the geometry into layers, such that in each layer there is only one depth value per layer per pixel. The number of layers needed is no more than one plus the worst-case depth complexity of the translucent geometry. Typically, this number is small. The back layer includes the opaque scene background. Later, we will describe methods for generating the layers from arbitrary geometry.

There is a set of depth buffers $Z_{Gn}$, and corresponding image or color buffers $RGB\alpha_{Gn}$. Together, these are called depth images. Let $Z_1$ and $Z_2$ be the two depth buffers, and let $C_1$ and $C_2$ be two color buffers. As we will see, $C_1$ is the base plane. Now, clear $C_1$ to RGB=0, and set $Z_1$ to the front clip surface, either the front clip surface of the view frustum or to a more general clip surface. Now set $Z_2 \leftarrow Z_{G0}$ and set $C_2 \leftarrow RGB_{G0}$. Render the volume from front-to-back to $C_1$, using Under, and discarding samples that are not between $Z_1$ and $Z_2$. This renders the samples that are inside the view frustum and are in front of $Z_{G0}$. When this rendering is complete, blend $C_1$ with $C_2$ using Under, leaving the result in $C_2$.

Set $Z_1 \leftarrow Z_2$ and $C_1 \leftarrow C_2$. Then, set $Z_2 \leftarrow Z_{G1}$ and $C_2 \leftarrow RGB\alpha_{G1}$, and render the volume again. This renders the samples that are between $Z_{G0}$ and $Z_{G1}$, blending them under the previous samples and the first layer of geometry. Repeat for each geometry layer. This blends each geometry layer in turn into its place in the volume. The final geometry layer is the background, which must be opaque.

This multi-pass process can be implemented such that it is nearly as fast as simply rendering the geometry and rendering the volume. If we use front-to-back rendering with ray termination and space leaping, then we process a minimum number of samples that are in front of the near depth buffer.

Note that this process, like the clipping process above, assumes that each sample is a single point, which is either in front, behind, or coincident with the depth value specified in the depth buffer. It is possible to view each sample as a region, e.g., a "cube of jelly" or some other shape, and treat the depth value as if it bisects the sample region. This can provide a degree of anti-aliasing at the clipping boundaries of the geometry.

Multiple Volume Objects in Same Scene

By adding the capability of writing to multiple depth buffers, we make it possible to render multiple interpenetrating volume objects in the same scene. We make the assumption, however, that no two volume objects have non-transparent values for the same voxel position. That is, volumes may interpenetrate each other only in the other's empty space, although a small amount of overlap will be correctly handled as described below.

We do this with a multi-pass process that does not require sorting the volume objects beforehand.

First, initialize $Z_1$ to the front clip surface, as above, and clear $C_1$ to RGB$\alpha$=0. Initialize $Z_2$ to the back of all of the volumes and $C_2$ to the background color. Then, render each of the volume objects in some order as follows.

Accept only samples between $Z_1$ and $Z_2$, blend samples along rays using Under, but keep the results in an compositing buffer. Using a gradient or $\alpha$-threshold test, detect the back surface of each volume along each ray. Wherever a surface is detected at a sample point along a ray, terminate that ray. Test the z-coordinate of that sample against $Z_2$; if it is less than the corresponding depth value in $Z_2$, then replace the depth value in $Z_2$ with the z-coordinate and replace the color value in $C_2$ with the accumulated color for that ray from the compositing buffer. Repeat for the next volume object, until all volume objects have been thus rendered. Finally, blend $C_1$ with $C_2$, leaving the result in $C_2$.

This marks the end of the first pass. The resulting $Z_2$ and $C_2$ reflect the front-most rear-facing surfaces of the combined scene. That is for any ray, its depth value in $Z_2$ is the exit point of that ray from the back of the object nearest to the viewer, and $C_2$ is the accumulated color up to that point. By rendering all of the objects, the parts of each rear surface nearest the viewer are extracted and captured in $C_2$ and $Z_2$.

For the next pass, set set $Z_1 \leftarrow Z_2$ and $C_1 \leftarrow C_2$. Then, set $Z_2$ to the back of all of the volumes and $C_2$ to the background color. Repeat the steps above for each volume object again. Looking only at the samples behind $Z_1$. This pass extracts the next rear facing surface and captures it in $Z_2$ and $C_2$. It then blends the result with the previous accumulated $C_1$.

Repeat these passes until nothing more is accumulated in $C_2$ and $Z_2$. The combined scene now captures all of the volumes in their appropriate juxtaposition with respect to each other, regardless of rendering order and translucency. For example, this method can be used to render the heart and the lungs as separate objects and have them appear in the right place in the scene, no matter what the view angle. If rendering also includes the ability to resample, then the volume objects do not even have to be registered with each other or have the same voxel spacing.

The above process approximates the correct result even if there is some overlap between non-transparent portions in the two volumes. Along a ray, the process composites together each contiguous non-transparent region within a volume into a single RGBα value at the back surface of the non-transparent region, and then sorts and composites these intermediate values. Therefore, if two volumes have a slight overlap of nontransparent regions, the overlapping voxels will not occlude each other properly, but will both be represented in the final image.

The fields where the present invention can be used are numerous, including medical imaging, structural engineering, geology, astrophysics, weather modeling, and many others. We used specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for rendering a volume data set onto an image plane, wherein the volume data set includes a plurality of three dimensional voxels, comprising the steps of:

defining a beginning clip surface and an ending clip surface;

processing a portion of the volume data set having a predetermined relationship to the beginning clip surface and the ending clip surface;

generating a next beginning clip surface from a result of the processing and from combining the beginning and ending clip surfaces, and generating a next ending clip surface; and repeating the processing and generating for the next beginning and ending clip surfaces until a termination condition is reached.

2. The method of claim 1 wherein each clip surface is stored in an associated depth buffer as clip depth values.

3. The method of claim 2 further comprising:

interpolating the voxels to produce volume samples, where each volume sample has an associated sample depth value.

4. The method of claim 3 wherein the predetermined relationship compares the sample depth values and the clip depth values.

5. The method of claim 1 wherein the defining, processing, generating, and repeating steps are performed in a front-to-back order.

6. The method of claim 1 wherein the defining, processing, generating, and repeating steps are performed in a back-to-front order.

7. The method of claim 2 wherein each depth buffer is associated with a color buffer to store pixel values.

8. The method of claim 7 wherein the color buffer associated with the beginning clip surface is initialized to a transparent color, and the color buffer associated with the ending clip surface is initialized to a background color.

9. The method of claim 1 wherein the volume includes a plurality of embedded objects.

10. The method of claim 9 wherein at least one of the plurality of embedded objects is translucent.

11. The method of claim 9 wherein a part of the ending clip surface is defined by surfaces of the plurality of embedded objects.

12. The method of claim 11 wherein each of the plurality of embedded objects is specified by polygons, and wherein the polygons are sorted in a depth order to define the ending clip surface.

13. The method of claim 1 wherein the volume includes a plurality of volume objects.

14. The method of claim 13 wherein a part of the ending clip surface is defined by a threshold test of opacity of the plurality of embedded volume objects.

15. The method of claim 13 wherein a part of the ending clip surface is defined by a gradient test of magnitude and direction.

16. A method for rendering a three-dimensional volume onto a two-dimensional image plane, comprising the steps of:

partitioning portions of the volume as defined by polygons into a plurality of layers;

sorting the plurality of layers in a front-to-back order;

initializing a near color buffer to a transparent color;

initializing a near depth buffer to a near clip surface;
   processing each of the plurality of layers by:
   initializing a far color buffer to the transparent color;
   initializing a far depth buffer to the front clip surface;
   drawing a current layer into the far color and depth buffers;
   rendering the volume, from the near clip surface to the far clip surface, into the near color and depth buffers, and after processing each of the plurality of layers;
   reinitializing the far color buffer to the background color;
   reinitializing the far depth buffer to the far clip surface; and
   rendering the volume, from the near clip surface to the far clip surface, into the near color and depth buffers.

17. A system for rendering a volume onto an image plane, comprising:

a first depth buffer storing depth values of a beginning clip surface;

a second depth buffer storing depth values of an ending clip surface;

means for processing a portion of the volume having a predetermined relationship to the beginning clip surface and the ending clip surface;

means for generating a next beginning clip surface from a result of the processing and from combining the beginning and ending clip surfaces, and storing a next ending clip surface in the second depth buffer; and means for repeating the processing and generating for the next beginning and ending clip surfaces until a termination condition is reached.

* * * * *